H. G. DUNLAP.
REVERSIBLE CHECK VALVE AND CUT-OFF.
APPLICATION FILED APR. 27, 1911.
1,005,523.
Patented Oct. 10, 1911.
2 SHEETS—SHEET 1.
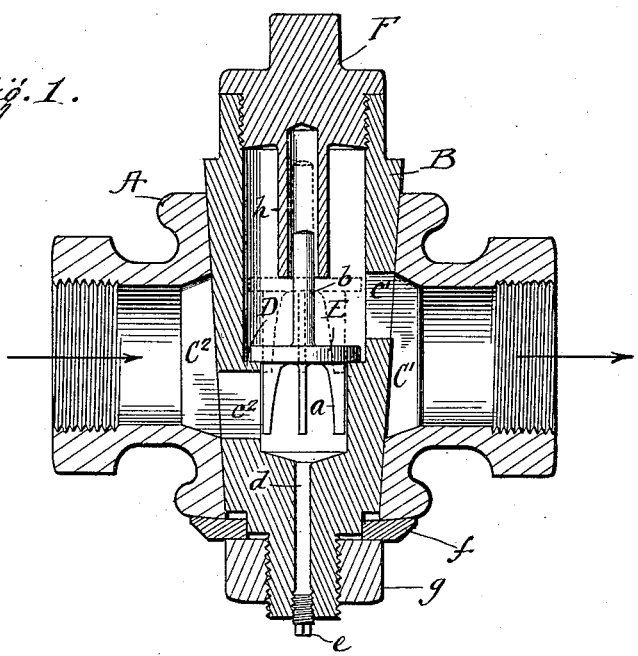
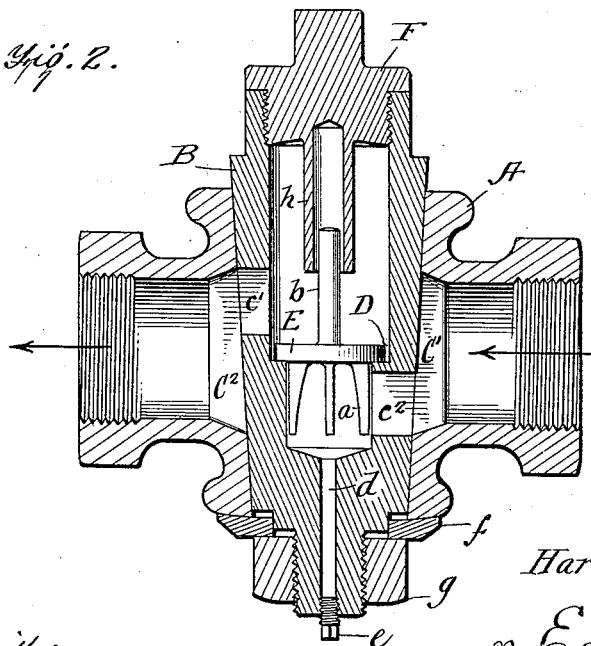
Witnesses
Inventor
Harry G. Dunlap,
By Edw. W. Byrn,
Attorney

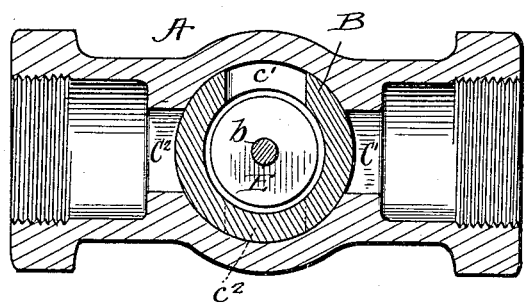
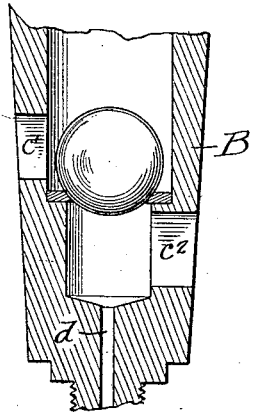
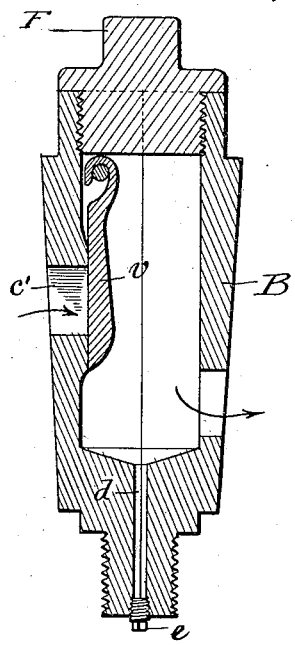

UNITED STATES PATENT OFFICE.

HARRY G. DUNLAP, OF CHICORA, PENNSYLVANIA.

REVERSIBLE CHECK-VALVE AND CUT-OFF.

1,005,523.  Specification of Letters Patent.  Patented Oct. 10, 1911.

Application filed April 27, 1911. Serial No. 623,592.

*To all whom it may concern:*

Be it known that I, HARRY G. DUNLAP, a citizen of the United States, residing at Chicora, in the county of Butler and State of Pennsylvania, have invented certain new and useful Improvements in Reversible Check-Valves and Cut-Offs, of which the following is a specification.

In the control of the flow of liquids, such as the piping of oil and in water distribution, it is very desirable in many cases to control the movement in either direction by a check valve, or to cut off the flow entirely.

The object of my invention is to provide for all of these conditions by a single valve of simple and practical construction which is a check valve capable of controlling flow in either direction and also a cut off valve.

It relates to that form of valve in which a turning plug is made of a size large enough to contain a check valve and is capable of rotation, so as to permit the flow of liquid through it in either direction, and my invention consists in the special construction and arrangement of a novel form of valve of this class which is made of a large size to adapt it to the piping of oil and which embodies a check valve within a large turning plug together with special provisions for preventing the check valve from becoming disabled and special provision for preventing the large turning plug from becoming immovable by access of grit and dirt to its ground joint, as will be hereinafter more fully described with reference to the drawing, in which—

Figure 1 is a vertical longitudinal section, showing the adjustment of parts for passing the liquid through from left to right. Fig. 2 is a similar view, showing the position of the parts for passing the liquid from right to left. Fig. 3 is a horizontal section, showing the position of parts for cutting off the flow entirely. Fig. 4 shows a ball valve which may be employed as a modification. Fig. 5 shows a modification in which the turning plug contains a hinge valve.

In the drawing, A represents the outer casing which is formed with two opposite screw threaded openings for connection with the incoming and outgoing pipes. This casing is bored with a tapered hole to receive a tapered turning plug B, which parts are fitted with a ground joint. The tapered plug is made longer than the usual plug and the openings $C'$ $C^2$ in the casing which communicate with the pipes are made narrow, but much deeper in vertical direction than usual, so as to communicate either with a port above the middle line of the plug or a port below said middle line. The plug B is made hollow and has at the middle line a circular shoulder D extending straight across and having a circular opening through it to form a valve seat for a check valve E with a cylindrical chamber below it. This valve has depending from its lower side a plurality of lugs $a$ that fit closely the cylindrical chamber below the valve seat, which lugs guide the valve as it moves up and down, and has also projecting from the top a stem $b$ which enters a tubular guide $h$ in the cap. In one side of the plug above the check valve is formed a port $c'$ and in the other side of the plug below the check valve is formed a port $c^2$. Both of these ports, however, are within the range of communication with the vertically elongated openings C C' of the casing which communicate with the pipes.

The lower end of the plug extends through the bottom of the casing and has a central hole $d$ through the same extending from the bottom of the valve chamber down through the end of the plug where it is closed by a detachable screw stopple $e$. The lower end of the plug is secured in the usual way by a washer $f$ and screw nut $g$.

At the upper end of the plug it is squared to receive a wrench for turning it and is also provided with a screw cap F which closes the top of the hollow plug. This screw cap and opening in the top of the plug are made large enough to permit the insertion or removal of the check valve through the same, and said screw cap is also formed with a downwardly extending tubular projection $h$ that receives and guides the top of the valve stem.

Now, with the parts in the position shown in Fig. 1, the liquid passing from left to right enters the lower port of the plug, lifts and passes through the check valve and issues through the upper port of the plug to the pipe on the right hand side, the check valve preventing any back movement. If, however, the plug be turned a half revolution, as in Fig. 2, then the lower port of the plug receives the liquid from the right hand side and passes it through the check valve to the pipe on the left hand side. It will thus be seen that the check valve is equally operative for checking the flow in either direction by merely reversing the plug. If it is desired to cut off the flow entirely, then the plug is turned only a quarter of a revolution, as in Fig. 3, and when left in this position the imperforate sides of the plug are long enough to entirely cover the elongated openings on the opposite sides of the casing.

My valve is especially designed for the piping of oil as from tank to tank in the oil fields, and is therefore made of large size to connect with large pipes of three inches diameter; more or less. When a turning plug is made of such large size to adapt it to this use it is important that the ground joints should be kept clear of all grit and dirt to prevent the turning plug from becoming jammed and immovable and it is also important that the check valve seat should be kept clear of such sedimentary obstruction. To accomplish these results without dismembering the parts or opening the valve the draining and clean out passageway $d$ is formed longitudinally through the small end of the turning plug and the screw stopple $e$ is provided for the same. This passageway opens downwardly from the trap chamber below the check valve and the stopple $e$ may be conveniently removed, without disconnecting the valve from the pipes, so as to discharge the grit and dirt from the trap chamber. This clean out passageway $d$ extends straight through the lower end of the turning plug and has an important and correlated action with a chambered plug and a check valve working in the same, for it permits, at any time, of the discharge of grit and sediment without stopping the flow of oil through the pipes or disconnecting the valve and thus maintains the operative condition of the check valve by preventing grit and sediment from getting on its seat and also discharges such grit and sediment without allowing any of it to get into the ground joint of the turning plug and causing it to become immovable.

In carrying out my invention I do not confine myself to any particular form of check valve. Thus, for instance, instead of the valve shown in Figs. 1 and 2, I may use a ball valve with a ring seat, as shown in Fig. 4, or, as in Fig. 5, the plug may be made more slender and in two separable longitudinal parts, and a hinge valve $v$ may be arranged within a chamber of the same to close over the port. This plug, however, is provided with the same drainage hole through the lower end of the same.

I claim:

1. The combination of a casing, a tapered reversible turning plug extending through both top and bottom of the casing and containing a chamber with a valve seat and a check valve on said seat, said plug having a clean out passageway from the bottom of the chamber of the plug through the smaller end of the plug and a closure for the same.

2. A reverse flow check valve comprising a casing, a hollow tapering turning plug extending through both top and bottom of the casing and containing a valve seat in its chamber with an opening in the plug above the valve seat on one side and an opening below the valve seat on the other side, a check valve on said seat, said plug having a clean out hole extending from the lower part of its chamber below the check valve straight down through the smaller end of the plug, a closure for said hole and a nut and washer on the lower end of the plug above said closure.

In testimony whereof I affix my signature in presence of two witnesses.

HARRY G. DUNLAP.

Witnesses:
DAVID M. DUNLAP,
C. M. FORREST.

---

Copies of this patent may be obtained for five cents each, by addressing the "Commissioner of Patents, Washington, D. C."